US009222514B2

(12) United States Patent
Erhardt et al.

(10) Patent No.: US 9,222,514 B2
(45) Date of Patent: *Dec. 29, 2015

(54) SECURING ELEMENT, A STEERING BEARING COMPRISING A SECURING ELEMENT, AND A STEERING COLUMN COMPRISING A STEERING BEARING AND A SECURING ELEMENT

(75) Inventors: Herbert Erhardt, Herzogenaurach (DE); Richard Baier, Aurachtal (DE); Jochen Ott, Roettenbach (DE); Rainer Lutz, Markt Erlbach (DE); Anton Erhardt, Herzogenaurach (DE); Peter Loncar, Herzogenaurach (DE); Reinhold Nuetzel, Adelsorf (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/236,490

(22) PCT Filed: Aug. 1, 2011

(86) PCT No.: PCT/EP2011/063179
§ 371 (c)(1),
(2), (4) Date: Apr. 9, 2014

(87) PCT Pub. No.: WO2013/017158
PCT Pub. Date: Feb. 7, 2013

(65) Prior Publication Data
US 2014/0216197 A1    Aug. 7, 2014

(51) Int. Cl.
*F16C 33/58* (2006.01)
*F16C 33/30* (2006.01)
(Continued)

(52) U.S. Cl.
CPC . *F16C 33/30* (2013.01); *B62D 1/16* (2013.01); *F16B 21/20* (2013.01); *F16C 19/06* (2013.01); *F16C 33/588* (2013.01); *F16D 1/0829* (2013.01); *Y10T 403/7052* (2015.01)

(58) Field of Classification Search
CPC .......... F16C 23/00; F16C 25/00; F16C 33/30; F16C 33/588; F16C 35/077; F16C 19/163; F16C 19/06; F16D 1/0829; F16B 21/20; B62D 1/16; Y10T 403/7052
USPC .............................. 74/492; 384/537; 403/368
See application file for complete search history.

(56) References Cited

U.S. PATENT DOCUMENTS 2,707,108 A * 4/1955 Schottler .......................... 279/54
3,107,766 A * 10/1963 Pritchard ...................... 192/89.1
(Continued)

FOREIGN PATENT DOCUMENTS

CH             628715        3/1982
CN           101881298      11/2010
(Continued)

*Primary Examiner* — Ruth Ilan
*Assistant Examiner* — Timothy Wilhelm
(74) *Attorney, Agent, or Firm* — Davidson, Davidson & Kappel, LLC

(57) ABSTRACT

A securing element (1, 11, 12, 13, 14) made of sheet metal with an annular body (3, 12a, 26) and with holding tongues (4, 41, 42, 43, 44) which emerge from the annular body (3, 12a, 26) and end at a hole (6) in the securing element (1, 11, 12, 13, 14), which hole is centered with respect to the center axis (5) of the securing element (1, 11, 12, 13, 14), wherein the hole (6) leads axially in the same direction as the center axis (5) through the securing element (1, 11, 12, 13, 14) and, at radial narrowest hole cross sections of the hole (6), is bounded at least by end edges (7, 71, 72, 73, 74) formed on the end sides of the holding tongues (4, 41, 42, 43, 44).

8 Claims, 8 Drawing Sheets

(51) Int. Cl.
*F16D 1/08* (2006.01)
*B62D 1/16* (2006.01)
*F16B 21/20* (2006.01)
*F16C 19/06* (2006.01)

(56) References Cited

U.S. PATENT DOCUMENTS

| | | | |
|---|---|---|---|
| 4,045,100 A | 8/1977 | Beauchet | |
| 4,206,617 A * | 6/1980 | Nakamoto | 464/99 |
| 4,339,158 A * | 7/1982 | Greener et al. | 384/489 |
| 4,480,490 A * | 11/1984 | Inoue | 74/401 |
| 4,573,713 A | 3/1986 | Kipp et al. | |
| 4,722,617 A * | 2/1988 | Stella et al. | 384/523 |
| 5,387,041 A * | 2/1995 | Lederman | 384/531 |
| 6,227,715 B1 * | 5/2001 | Erhardt et al. | 384/518 |
| 6,375,360 B1 * | 4/2002 | Weisskopf et al. | 384/538 |
| 7,878,714 B2 * | 2/2011 | Arnault et al. | 384/612 |
| 9,032,833 B2 * | 5/2015 | Erhardt et al. | 74/492 |
| 2008/0247701 A1 | 10/2008 | Kapaan | |
| 2010/0308569 A1 | 12/2010 | Delos | |
| 2012/0210819 A1 * | 8/2012 | Delos et al. | 74/492 |
| 2014/0157938 A1 * | 6/2014 | Erhardt | 74/492 |

FOREIGN PATENT DOCUMENTS

| | | |
|---|---|---|
| CN | 101069024 | 11/2011 |
| DE | 2507522 | 10/1976 |
| DE | 33 05 419 A | 8/1984 |
| DE | 10 2009 051 107 B3 | 4/2011 |
| DE | 102009051107 | 4/2011 |
| EP | 0 078 163 | 5/1983 |
| EP | 2 249 050 A1 | 11/2010 |

* cited by examiner

SECURING ELEMENT, A STEERING BEARING COMPRISING A SECURING ELEMENT, AND A STEERING COLUMN COMPRISING A STEERING BEARING AND A SECURING ELEMENT

The invention concerns a securing element made of sheet metal and comprising an annular body and retaining tongues which start from the annular body and end at a hole in the securing element, which hole is centered relative to the central axis of the securing element and extends axially through the securing element in the same direction as the central axis while being defined at narrowest radial hole cross-sections of the hole at least through front edges configured on end sides of the retaining tongues. The invention further concerns a steering bearing comprising such a securing element and a steering bearing as also a steering bearing comprising at least one of the securing elements.

BACKGROUND

Securing elements of the aforesaid type are supported through the retaining tongues by positive engagement and force-locking on the surface of a shaft. The securing elements also designated as indented rings in DE 33 05 419 A1 are resilient and hardened. The radial dimensions of the clear cross-section of a hole between the retaining tongues (teeth) situated opposite each other at the central axis of the indented ring are smaller than the outer radial dimensions of the shaft measured in the same direction on the seat of the indented ring. When the indented ring is pushed onto the shaft, the teeth deflect elastically and yield outwards so that the free cross-section of the hole is enlarged to the outer radial dimensions of the shaft and the shaft can be pushed into the hole.

The front edges of the retaining tongues dig themselves slightly into the surface of the shaft at the desired position of the indented ring under the resilient pre-stress exerted by the retaining tongues. For this purpose, the shaft must have a soft surface. The front edges cut themselves into the material on the surface of the shaft. The seat of an indented ring is therefore formed as a rule by positive engagement and force-locking. When the indented ring is loaded in a direction opposite the original insertion direction of the shaft, the indented ring is supported through the retaining tongues on the shaft and digs itself into this. Such securing elements are therefore designated as self-locking securing elements.

Advantageously, securing elements of this type can be fixed on shafts at any desired points irrespective of the tolerances. In addition, these securing elements can be manufactured economically as mass articles and are preferably used, for example, in the upper part of steering columns for assuring the shaft seating of steering bearings on the steering shaft.

A steering column of the generic type is described in EP 2 249 050 A1. The steering bearings are angular contact ball bearings. The inner rings of two angular contact ball bearings positioned against each other and pre-stressed against each other are centered, each one, by a respective clamping ring on the shaft. A wavy spring or another spring is elastically biased in axial direction against each of the clamping rings. The spring, the clamping ring and thus also the respective inner ring is fixed in place through an indented ring.

A steering bearing of the generic type for a rotatable mounting of a shaft configured as a steering spindle in a steering column tube is described in DE 10 2009 051 107 B3. The inner ring of the angular contact ball bearing is configured integrally with the generic securing element. Advantageously, one component less must be mounted during assembly of the steering column. The work and expenditure for the assembly, the feeding, the storage and transportation can be kept at a low level. In addition, manufacturing costs of such steering columns are also reduced.

Steering columns are sub-assemblies of which high demands are made with respect to safety of operation and behavior during a crash. For example, a dagger-like penetration of the steering spindle into the driver's cab during a crash must be absolutely excluded. The requirements made of the axial retaining ability of the generic securing elements are therefore very high.

Indented rings and inner rings of steering bearings with integrated securing elements are punched out of sheet metal and cold shaped. The front edges are the result of the initial punching of the mostly rotationally symmetric rings. Not least of all, the retaining ability of the securing elements depends on the configuration of the front edges.

Edges are usually formed by two converging surfaces. One of these surfaces that end at the front edge is accordingly the front end surface of the retaining tongues that extends crosswise to both the front surfaces of the retaining tongues and is directed towards the central axis. This front end surface is created during the manufacture of the securing element by punching and defines a part of the hole in the securing element in radial direction. The other surface is a planar section on a front side of the securing element of the respective retaining tongue and is directed in direction of the shaft during the mounting of the indented ring in feeding direction.

SUMMARY OF THE INVENTION

It is an object of the present invention to provide securing elements as well as steering bearings preferably for use in steering columns, whose shaft seats are reliably retained and which can be manufactured in a simple and economical manner.

The present invention provides a securing element made of sheet metal and comprising an annular body and retaining tongues which start from the annular body and end at a hole in the securing element, which hole is centered relative to the central axis of the securing element and extends axially through the securing element in the same direction as the central axis while being defined at radially narrowest hole cross-sections of the hole at least through front edges configured on end sides of the retaining tongues.

Each retaining tongue comprises on an end side at least one depression in a surface of the retaining tongue, said depression being defined in at least one direction, at least at one point through at least one of the front edges.

According to one embodiment of the invention, the thickness of the sheet metal of each retaining tongue at the depression is smaller than in the other sections of this retaining tongue. The sheet metal thickness of the retaining tongue becomes preferably continuously smaller in direction of its free end adjoining the hole, the front edge being formed on the end side at the thinnest point and the depression extending over the entire tangentially or peripherally directed width of the retaining tongue. Alternatively, an end section of the retaining tongue is reduced for instance through stamping in the sheet metal thickness, the front edge likewise extending over the entire tangentially or peripherally directed width of the retaining tongue.

Alternatively, the depression interrupts the front edge in form of a stamping, so that, at this point, the sharp front edge is broken by the depressions and is not sharp. The front edge extends further on both sides of the depression.

According to one proposition of the invention, the depression is shortened through depressions adjoining the front edge on one or preferably on both sides of the front edge, which front edge normally extends over the entire width of the retaining tongue. Besides this, the front edges on an indented element can be interrupted by a plurality of depressions. Further, the depressions can interrupt or end the front edges on a tooth at any desired point. Still further, the depressions can be spaced on the periphery at equal or different distances to one another.

Such configurations can have a positive effect on a still further improved retaining ability because, then, on the whole, the front edge claws itself better into the surface of the shaft for an improved osculation due to the fact that, by reason of the interruptions through the depressions, the peripherally directed contour of the front edge is supported at more than only two points on the surface of the steering spindle. Moreover, tooth-like sharp corners are configured at the points defined by the depressions, through which corners the front edge can penetrate better into the surface of the shaft.

According to one feature of the invention, the two surfaces that create the front corner are inclined at least with one acute angle to each other on at least one of the retaining tongues, preferably on all the retaining tongues of the securing element. The angle included between these surfaces and starting from the front edge is situated in a range of $15° \leq \alpha \leq 60°$. The cutting edge is interrupted by at least one of the depressions.

In deviation from the prior art, the securing element described in the invention comprises two surfaces, the end side surface and the front end surface, that, starting from the front edge, are inclined after the manner of a bezel at an acute angle to each other. For a large part of securing elements this alone assures an improved retaining ability on shafts because a sharp edge penetrates very effectively into the surface of the shaft. The shaft should preferably be made of unhardened steel and the securing element should be hardened as far as possible at least on the front edge configured as a bezel. With a view to the resistivity, the resilient behavior and for cost reasons, it is advantageous if the entire securing element or an inner ring configured integrally with the securing element is hardened.

There are also securing elements in which the retaining tongues, at the stage in which the securing element is ready-manufactured but not yet mounted on a shaft, end with a radial plane, that is to say they are not stamped out axially in the initial state. The retaining tongues of such securing elements are pressed out of the radial plane and brought into an inclined position only when the shaft is inserted into the hole which is slightly too small for the outer diameter of the shaft. The retaining tongues must deflect resiliently in the same direction as the direction of insertion of the shaft till the hole has become large enough for the diameter of the shaft. The invention also applies to such securing elements. But preferably, the invention applies to those securing elements in which the retaining tongues are stamped out inclined at an acute angle to the radial plane already during manufacturing. It is not of importance whether the retaining tongues are inclined at an angle to the radial plane or extend in an arc-shape relative to the radial plane or are discontinuously inclined.

According to one feature of the invention, the bezel-like configured front edge protrudes beyond the level of one of the surfaces or beyond the level of both surfaces that converge into each other on the front edge. Shortly before the front edge, the surface section ascends with a curved or linear shape out of the respective surface to extend beyond the level thereof up to the front edge. The advantage of this is that, in spite of the possible undesired edge interruptions on the soft part due to the edge protruding out of the surfaces, a comparatively sharp residual material can always remain in existence.

The front or cutting edges of the retaining tongues extend in a straight line or, for instance, tangentially directed. Alternatively they extend in a curve on a circumferential line whose curvature corresponds to the curvature of the surface of the shaft on which the securing element is to be seated later.

The retaining tongues of the securing elements are made preferably in one piece and out of one material with the annular body. In peripheral direction, for forming the retaining tongues, the annular body is incised for forming radial slits through which the retaining tongues are separated from peripherally adjacent retaining tongues while being resiliently movable relative to one another. The circumferentially closed annular body or the annular body comprising one slit retains the retaining tongues peripherally in place because these are configured in one piece the annular body. The slits can be so small that the retaining tongues are in contact with each other at the slits. In one preferred embodiment of the invention, in contrast, the central hole of the securing element is defined by an inner edge comprising recesses and adjoining the front edges. The retaining tongues are separated in peripheral direction from one another by the recesses that end on the annular body and are open towards the hole. The circumferentially closed annular body or, alternatively, the annular body comprising one slit, holds the retaining tongues together. Through the rounding of the recesses, notch stresses in the securing element and cracks resulting therefrom can be avoided. Besides this, through the choice of suitable dimensions for the recesses, the resilient behavior of the retaining tongues can be variably designed.

The invention provides a steering bearing comprising a securing element according to the invention. The steering bearing comprises at least the inner ring and rolling elements, an outer raceway possibly on an outer ring or directly in a steering column tube, and a cage. The securing element is integrated into the steering bearing, optionally as a separate component in a self-retaining unit, that is formed for example out of an outer ring, balls, an inner ring, a spring ring and an indented ring. Alternatively the securing element is configured in one piece and in one material with the inner ring of the steering bearing.

The invention further provides a steering column comprising at least one steering tube and a steering spindle rotatably mounted with help of steering bearings in the steering tube. In this steering column, the inner ring of the steering bearing is fixed with help of at least one securing element through positive engagement and by force-locking on the steering spindle, the securing element being configured as a separate component or integrated in the inner ring. The inner ring is supported axially on the steering spindle, in a rigid or an elastic manner, with or without interposition of at least one spring element, on the securing element that is fixed on the steering spindle.

By the term "shafts" are to be understood all components and machine elements that are rotatable or rigid and are suitable and provided for receiving and fixing different components.

BRIEF DESCRIPTION OF THE DRAWINGS

The invention will be described more closely in the following with reference to the appended drawings in which:

FIG. 6 shows a securing element 12 in form of an indented ring whose retaining tongues 4, comprise, each one, two depressions 32 in the surfaces 82 and 92 which are characterized by a surface 32a.

DETAILED DESCRIPTION

Figure 1:
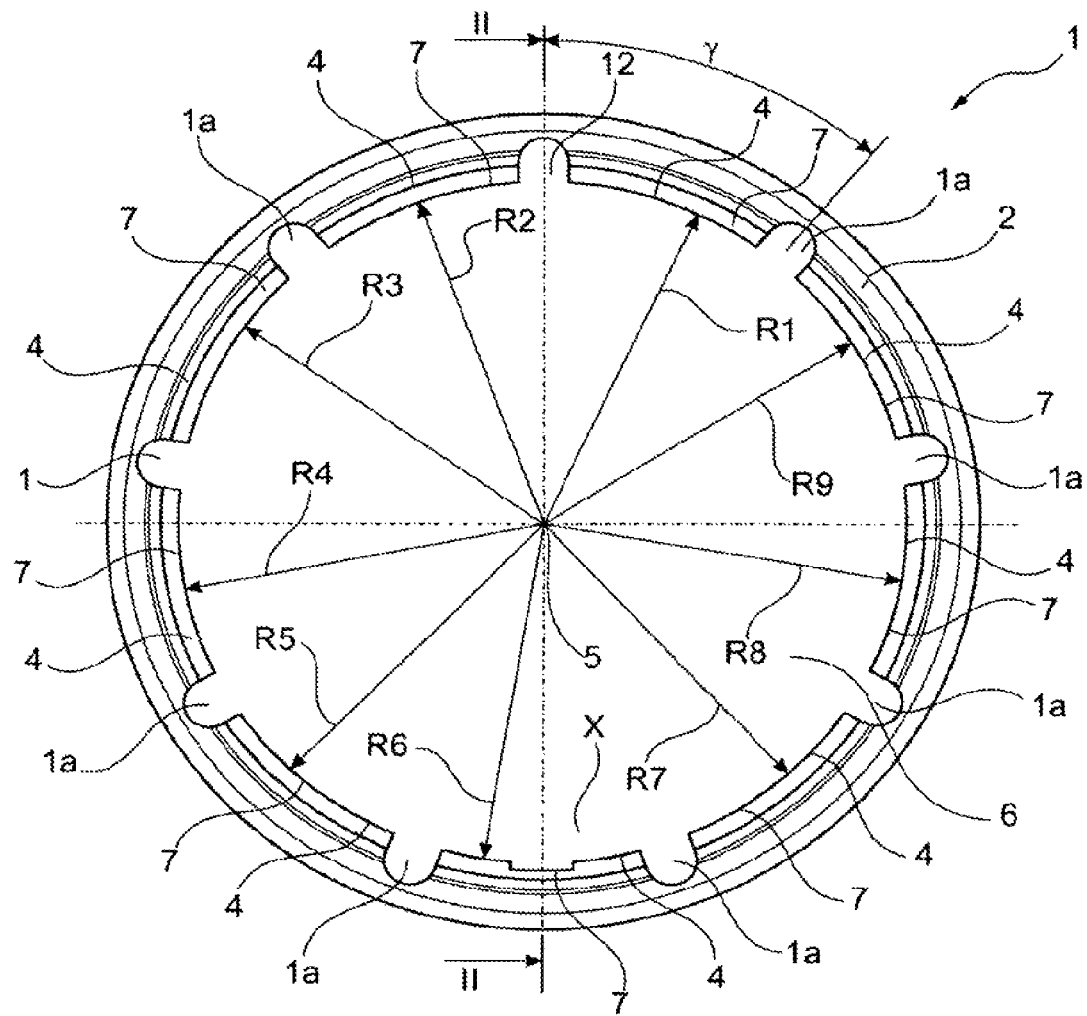
FIG. 1 shows a face view of a securing element 1 that is configured as an indented ring 2.

FIGS. 1, 1a, 2 and 3:

FIG. 1 shows a face view of a securing element 1 that is configured as an indented ring 2.

Figure 1A:
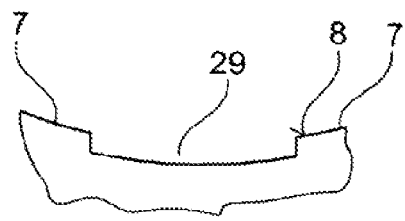
FIG. 1a shows the detail X out of FIG. 1 in an enlarged, not-to-scale view.

FIG. 1a shows the detail X out of FIG. 1 in an enlarged, not-to-scale view.

Figure 2:
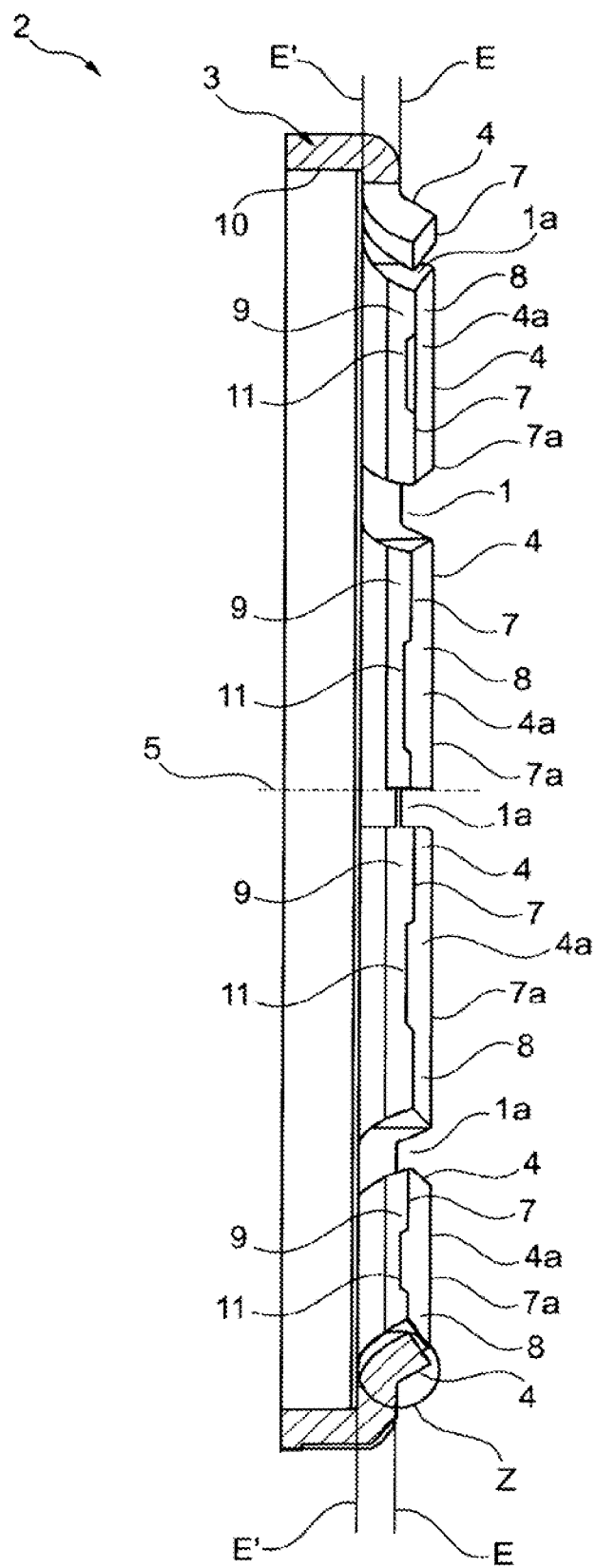
FIG. 2 shows a sectional representation of the securing element 1 taken along the line II-II of FIG. 1 and along the central axis 5.

FIG. 2 shows a sectional representation of the securing element 1 taken along the line II-II of FIG. 1 and along the central axis 5.

Figure 3:
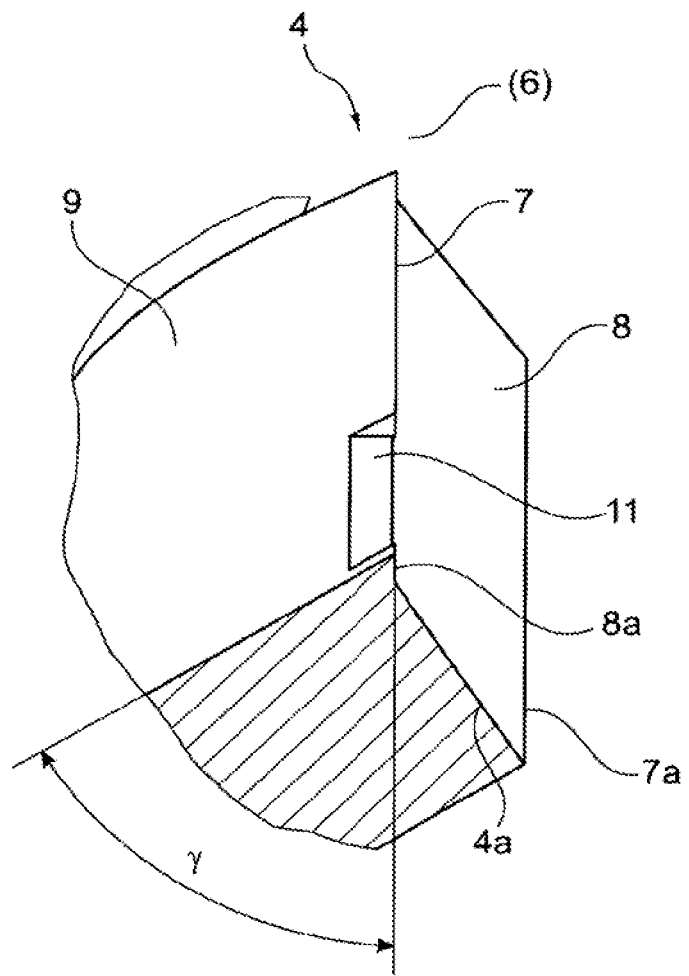
FIG. 3 shows a not-to-scale, enlarged illustration of the detail Z of FIG. 2.

FIG. 3 shows a not-to-scale, enlarged illustration of the detail Z of FIG. 2.

The securing element 1 comprises an annular body 3 comprising retaining tongues 4 that end in the securing element 1 at a hole 6 that is centered relative to the central axis 5 of the securing element 1. The hole 6 extends axially in the same direction as the central axis 5 through the securing element 1. The radially narrowest points of the hole 6 are described through the inner radii R1 to R9 and are defined at end sides of the retaining tongues 4 by front edges 7. Further, the hole 6 is defined by an inner edge comprising recesses 1a and adjoining the front edges 7. The recesses 1a start from the annular body 3 and are open towards the hole 6, so that the retaining tongues 4 are separated from one another in peripheral direction and are uniformly spaced from one another along the periphery at an angular pitch of Y.

At each front edge 7, at least two respective surfaces 8 and 9 that define a part of the surface of each retaining tongue 4 converge into each other. The surface 8 is configured on a front end side of each retaining tongue 4 and defined by the front edges 7 and 7a. The other surface 9 covers the front side of the securing element 1 and is a planar section that continues in an inner cylindrical surface 10 of the annular body 3.

FIG. 1a shows how one of the surfaces 8—the front end surface at the center of the retaining tongue 4—can comprise for example a depression 29 worked radially into the end 4a of the retaining tongue 4. The depression 29 is defined on the left and the right side laterally by the front edge 7 which is interrupted in this way by the depression 29.

The retaining tongues 4 are stamped axially out of the parallel radial planes E and E' and are inclined relative to the respective radial planes E and E' which are crossed perpendicularly by the central axis 5.

FIG. 3: The surfaces 8 and 9 start from the front edge 7 and are inclined at an acute angle α towards each other. As a result, the front edge 7 protrudes radially further out of the end 4a of the respective retaining tongue 4 in direction of the central axis 5 than the front edge 7a so that it is only the front edge 7 that comes into contact with the surface of the shaft when this is inserted into the hole 6. Moreover, the front edge 7 protrudes in radial direction beyond the surface 8 (front end surface) because the surface 8 comprises in the direction of the front edge 7 a flat, planar section 8a that follows a course that ascends from the surface 8 in direction of the front edge 7 beyond the level of the surface 8 up to the front edge 7 so that the front edge 7 protrudes beyond the actual level of a front edge and of the front end side surface 8 into the hole 6.

FIGS. 2 and 3: The front edge 7 on each retaining tongue 4 is interrupted in the surface section 8a and in the surface 9 by a depression 11 that extends partially into both the surfaces 8 and 9. The depression 11 comprises a surface 11a that extends from the surface 8 to the surface 9 and is defined on the left and the right side in tangential direction by the front edge 7.

Figure 4:
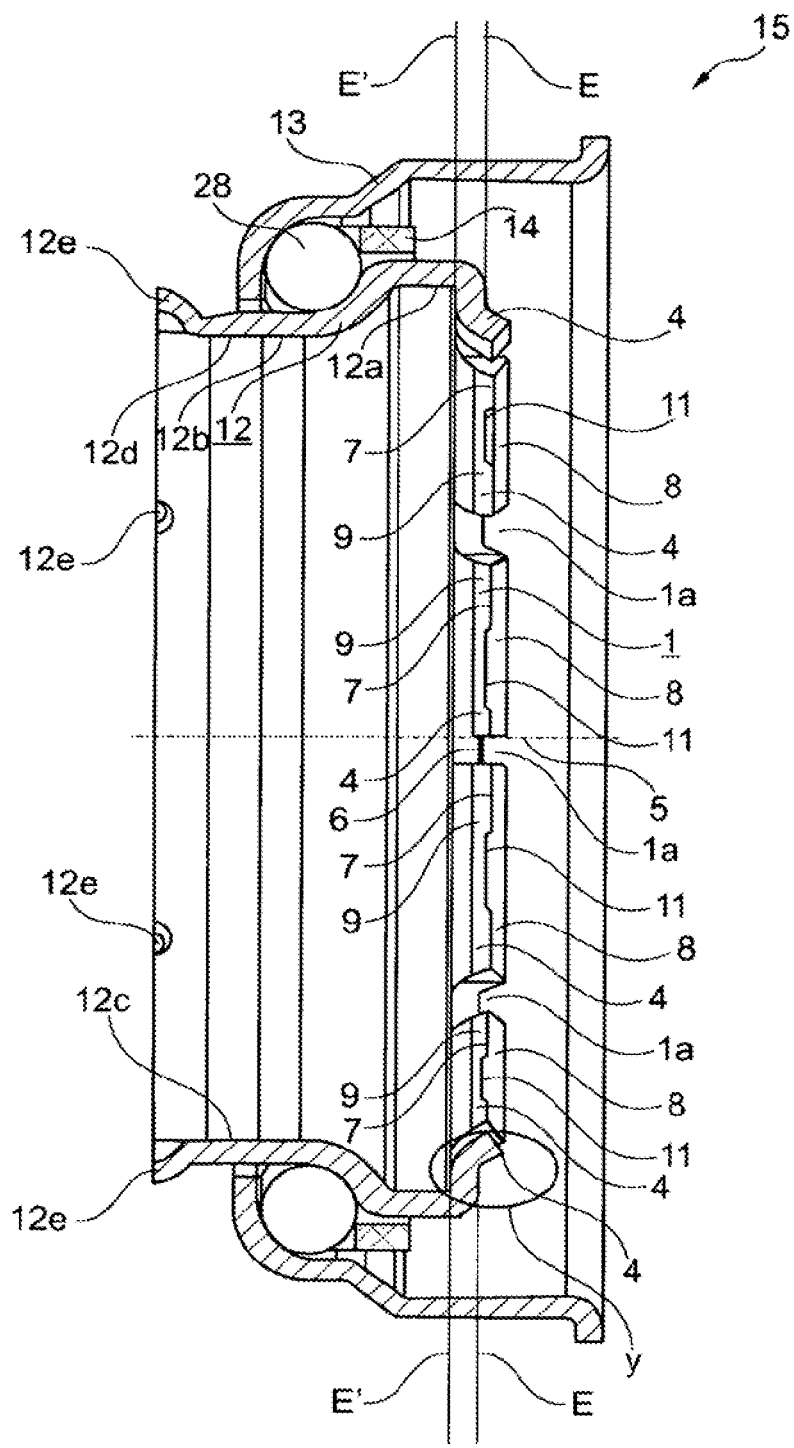
FIG. 4 shows a steering bearing IS that is made up of an inner ring 12, an outer ring 13 and rolling elements 28 that are guided in a cage 14.

FIG. 4: FIG. 4 shows a steering bearing 15 that is made up of an inner ring 12, an outer ring 13 and rolling elements 28 that are guided in a cage 14. The securing element 1 is configured in one piece with the inner ring 12. The annular body 12a of the securing element 1 is configured in one piece with a raceway section 12b of the inner ring 12. The rolling elements 28 run on the raceway section 12b. The raceway section 12b is followed by a shaft seat section 12c that is configured in one piece with the inner ring 12 and is adjoined by a lengthening section 12d of the inner ring 12. Retaining lugs 12e are formed in radially outward direction on the lengthening section 12d, through which retaining lugs 12e the individual parts, outer ring 13, cage 14 with rolling elements 28 and the inner ring 12 with the securing element 1, are retained in form of a self-retaining unit.

FIGS. 1, 3 and 4: The securing element 1 comprises the annular body 12a but, for the rest, also corresponds to the structure shown in FIGS. 1 and 3, FIG. 3 showing in this case, the detail Y of FIG. 4. The annular body 12a is provided with retaining tongues 4 which end in the securing element 1 at a hole 6 that is centered relative to the central axis 5 of the securing element 1. The hole 6 extends axially in the same direction as the central axis 5 through the securing element 1. The course of the front edges 7 is described at radially narrowest points of the hole 6 by the inner radii R1 to R9. The hole 6 is further defined by an inner edge comprising recesses 1a and adjoining the front edges 7. The recesses 1a start from the annular body 3 and are open towards the hole 6 so that the retaining tongues 4 are separated from one another in peripheral direction and are uniformly spaced from one another along the periphery at an angular pitch of Y.

At each front edge 7, at least two respective surfaces 8 and 9 that define a part of the surface of each retaining tongue 4 converge into each other. The surface 8 is configured on a front side of each retaining tongue 4 and ends on the front edges 7 and 7a. The other surface 9 covers the front side of the securing element 1 and is a planar section that continues in an inner cylindrical surface 10 of the annular body 3. The retaining tongues 4 are stamped out of the parallel radial planes E and E' and are inclined with respect to these radial planes E and E'.

The surfaces 8 and 9 start from the front edge 7 and are inclined at an acute angel a towards each other. The front edge 7 protrudes in radial direction beyond the actual level of the surface 8 (front end surface). The planar section 8a follows a course that ascends from the surface 8 towards the front edge 7 beyond the level of the surface 8 up to the front edge 7 so that the front edge 7 protrudes beyond the front end side surface 8 into the hole 6.

FIGS. 3 and 4: The respective front edge 7 of each retaining tongue 4 is interrupted by a depression that extends partially into both the surfaces 8 and 9.

FIGS. 5, 6 7 and 8: The FIGS. 5, 6, 7 and 8 show examples of embodiment of securing elements $1_1$, $1_2$, $1_3$ or $1_4$ in which the designs of the retaining tongues $4_1$, $4_2$, $4_3$ or $4_4$ with respect to the depressions 31, 32, 33 or 34 differ from one another.

Figure 5:
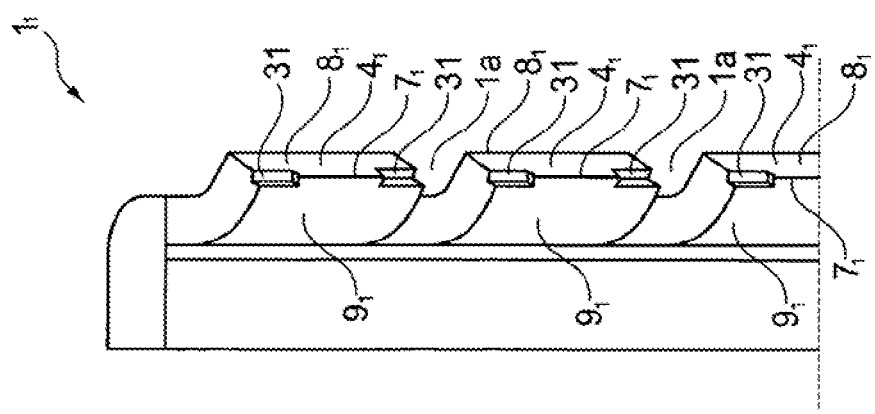
FIG. 5 shows a securing element 1 in form of an indented ring whose retaining tongues $4_1$ comprise, each one, two step-like depressions 31 in the surfaces $8_1$ and $9_1$.

FIG. 5 shows a securing element 1 in form of an indented ring whose retaining tongues $4_1$ comprise, each one, two step-like depressions 31 in the surfaces $8_1$ and $9_1$. The depressions 31 adjoin the front edge $7_1$ on the left and the right side of the front edge $7_1$ and are defined at one point on one side by the front edge $7_1$ and on the other side by the recesses 1a.

Figure 6:
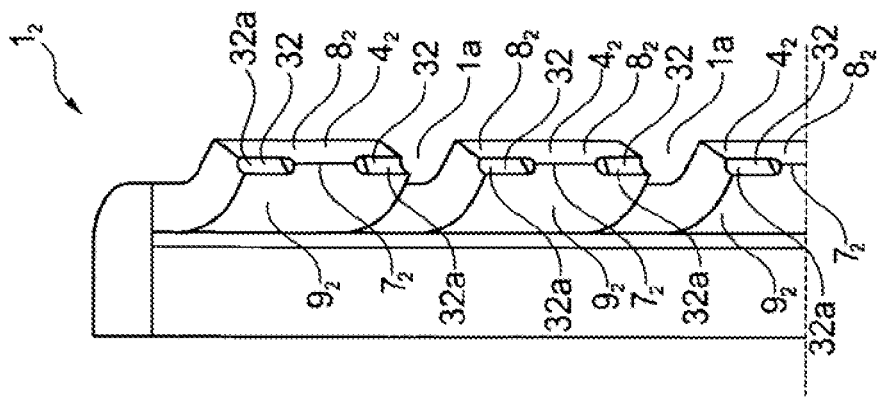

FIG. 6 shows a securing element 1 in form of an indented ring whose retaining tongues $4_2$ comprise, each one, two depressions 32 in the surfaces 82 and 9, which are characterized by a surface 32a. The surface 32a extends between the surfaces 8 and 9. On the left and the right side of the front edge $7_2$, the depressions 32 adjoin the front edge $7_2$ and are defined at one point on one side by the front edge $7_2$ and on the other side by the recesses 1a.

Figure 7:
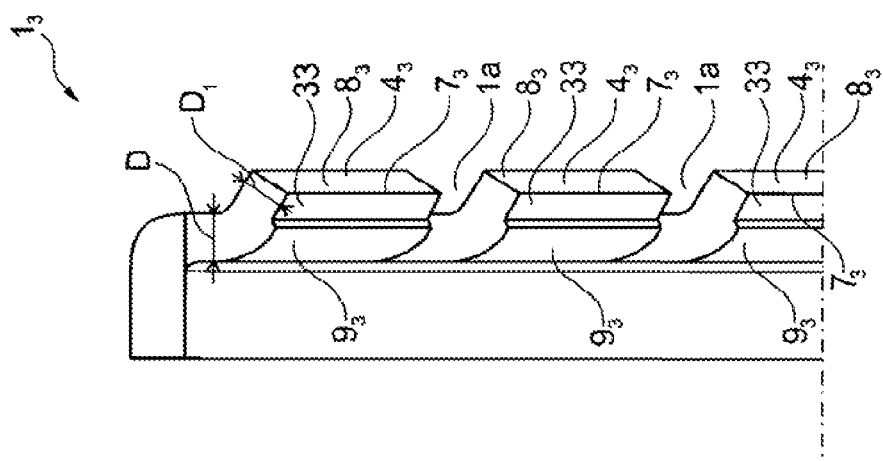
FIG. 7 shows a securing element $1_3$ in form of an indented ring whose retaining tongues 4, comprise, each one, a step-like depression 33 in the surface $9_3$.

FIG. 7 shows a securing element $1_3$ in form of an indented ring whose retaining tongues 43 comprise, each one, a step-like depression 33 in the surface $9_3$. The thickness $D_1$ of the sheet metal of each retaining tongues $4_3$ at the depression 33 is smaller over the entire width of the retaining tongue $4_3$ than the thickness D in the remaining sections of this retaining tongue 43. The lower edge of the depression 33 is defined by the front edge $7_3$. Furthermore, it is imaginable for the front edge to be interrupted by depressions after the manner of the illustrations in FIGS. 2 to 5.

Figure 8:
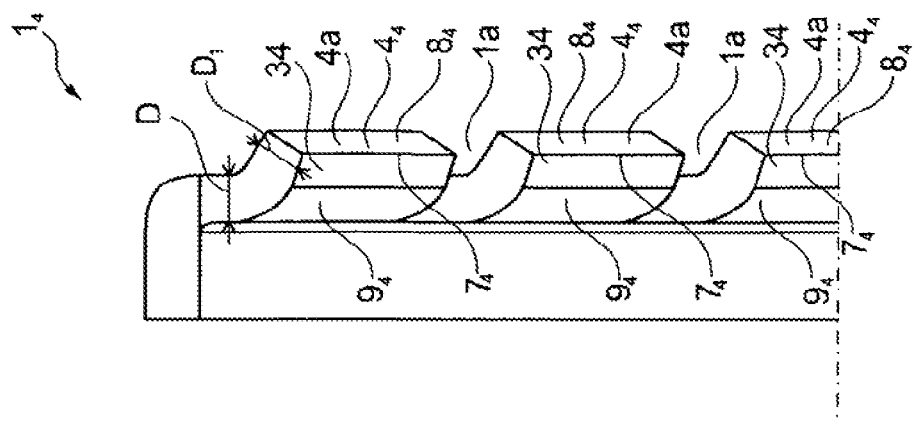
FIG. 8 shows a securing element $1_4$ in form of an indented ring in which, due to the respective depression 34, the thickness D of the sheet metal of the retaining tongues $4_4$, is increasingly reduced towards the end 4a to the thickness $D_1$.

FIG. 8 shows a securing element $1_4$ in form of an indented ring in which, due to the respective depression 34, the thickness D of the sheet metal of the retaining tongues $4_4$, is increasingly reduced towards the end 4a to the thickness $D_1$. The lower edge of the depression 34 is defined by the front edge $7_4$. Furthermore, it is imaginable for the front edge to be interrupted by depressions after the manner of the illustrations in FIGS. 2 to 5.

Figure 9:
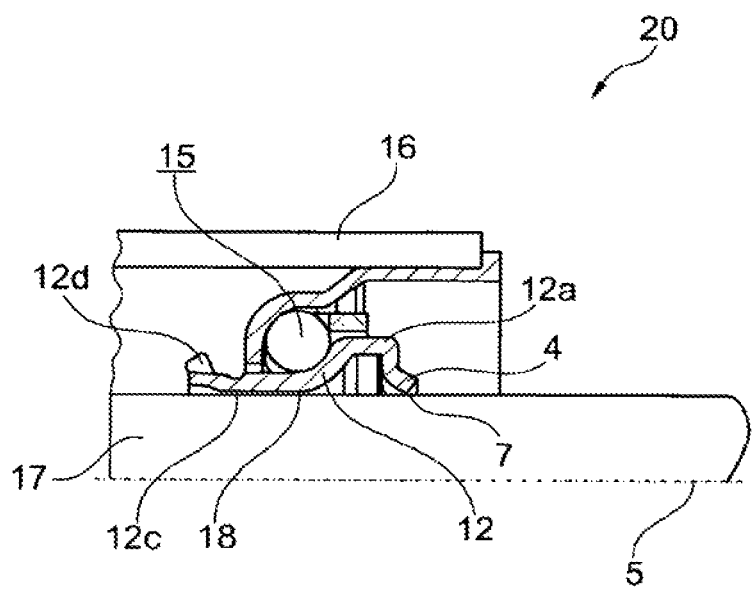
FIG. 9 shows a part of a steering column 20 in a longitudinal section along a central axis 5 of a steering spindle 17.

FIG. 9 shows a part of a steering column 20 in a longitudinal section along a central axis 5 of a steering spindle 17. The steering column 20 comprises the steering bearing 15, a steering tube 16 and the steering spindle 17. The steering spindle 17 is mounted rotatably in the steering tube 16 with help of the steering bearing 15. For this purpose, the outer ring 13 is fixedly seated in the steering tube 16 and the inner ring 12 is fixedly seated on the steering spindle 17. The inner ring 12 is supported through the shaft seat section 12c on the shaft seat 18 of the steering spindle 17, possibly with a press fit. The lengthening section 12d has no contact with the steering spindle 17. Further, with help of the securing element 1, the inner ring 12 is axially secured on the steering spindle 17 against axial thrust loads. For this purpose, the retaining tongues 4 are resiliently biased against the surface 19 of the steering spindle 17 and are clawed with the front edges 7 into the surface 19.

Figure 10:
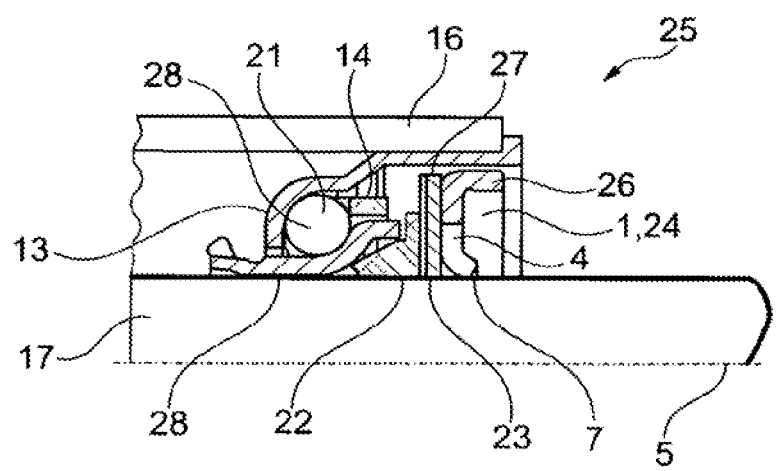
FIG. 10 shows a part of a steering column 25 in a longitudinal section along its central axis 5.

FIG. 10 shows a part of a steering column 25 in a longitudinal section along its central axis 5. The steering column 25 comprises a steering bearing 21 in the steering tube 16, a clamping ring 22, a wavy spring 23 and a securing element 1 in form of an indented ring 24 as also the steering spindle 17.

FIGS. 1, 3 and 10. Substantially, the indented ring 24 has the same structure as the indented ring 2 and is described through the description of FIGS. 1 and 3. In contrast to the indented ring 2, the securing element 1 does not comprise the annular body 3 but the annular body 26 which, as shown in the figures, is directed towards the right and surrounds the retaining tongues 4 peripherally. As a result, the indented ring 24 comprises a flat front end surface 27 on which the wavy spring 23 is supported. The indented ring 24 is supported on the steering spindle 17 with help of the retaining tongues 4 against the force of the wavy spring 23. With help of the wavy spring, the clamping ring 22 is pressed and clamped between the inner ring 28 of the steering bearing 21 and the steering spindle 17. The inner ring 21 is supported in one direction through the clamping ring 22 on the steering spindle 17 and is otherwise without contact with the steering spindle 17 while being supported in the other direction on the outer ring 13 through the rolling elements 28 that are guided in the cage 14.

| Reference numerals | | | |
|---|---|---|---|
| 1 | Securing element | 9 | Surface |
| $1_1$ | Securing element | $9_1$ | Surface |
| $1_2$ | Securing element | $9_2$ | Surface |
| $1_3$ | Securing element | $9_3$ | Surface |
| $1_4$ | Securing element | $9_4$ | Surface |
| 1a | Recess | 10 | Inner cylindrical surface |
| 2 | Indented ring | 11 | Depression |
| 4 | Retaining tongue | 12 | Inner ring |
| $4_1$ | Retaining tongue | 12a | Annular body |
| $4_2$ | Retaining tongue | 12b | Raceway section |
| $4_3$ | Retaining tongue | 12c | Shaft seat section |
| $4_4$ | Retaining tongue | 12d | Lengthening section |
| 4a | End | 12e | Retaining lugs |
| 5 | Central axis | 13 | Outer ring |
| 6 | Hole | 14 | Cage |
| 7 | Front edge | 15 | Steering bearing |
| $7_1$ | Front edge | 16 | Steering tube/steering column tube |
| $7_2$ | Front edge | 17 | Steering spindle |
| $7_3$ | Front edge | 18 | Shaft seat |
| $7_4$ | Front edge | 19 | Surface of steering spindle |
| 7a | Front edge | 20 | Steering column |
| 8 | Surface | 21 | Steering bearing |
| $8_1$ | Surface | 22 | Clamping ring |
| $8_2$ | Surface | 23 | Wavy spring |
| $8_3$ | Surface | 24 | Indented ring |
| $8_4$ | Surface | 25 | Steering column |
| 8a | Surface section | 26 | Annular body |
| 27 | Flat surface | | |
| 28 | Rolling element | | |
| 29 | Depression | | |
| 31 | Depression | | |
| 32 | Depression | | |
| 32a | Surface | | |
| 33 | Depression | | |
| 34 | Depression | | |

The invention claimed is:

1. A securing element made of sheet metal and comprising:
an annular body; and
retaining tongues starting from the annular body and ending at a hole in the securing element, the hole being centered relative to a central axis of the securing element and extending axially through the securing element in a same direction as the central axis while being defined at radially narrowest hole cross-sections of the hole at least through front edges configured on end sides of the retaining tongues, each retaining tongue comprising on an end side at least one depression in a surface of the retaining tongue, the depression being defined in at least one direction, at least at one point through at least one of the front edges,
  wherein the front edge is configured at least partially in form of a cutting edge protruding on an end side out of the retaining tongue, the cutting edge being defined through at least two surfaces of the retaining tongue extending towards each other at an acute angle and converging into each other at the front edge, the depression being made in at least one of the surfaces.

2. The securing element as recited in claim 1 wherein a thickness of the sheet metal of the respective retaining tongue on the depression is smaller than a thickness in remaining sections of the retaining tongue.

3. The securing element as recited in claim 1 wherein the depression is defined only at one point through the front edge.

4. The securing element as recited in claim 1 wherein the depression interrupts the front edge and is defined at two points through the front edge.

5. The securing element as recited in claim 1 wherein each retaining tongue protrudes at a slant out of a radial plane crossed perpendicularly by the central axis, each retaining tongue being at an acute angle to the radial plane.

6. A steering bearing comprising:
  at least an inner ring;
  an outer ring;
  rolling elements arranged between the inner ring and the outer ring; and
  the securing element as recited in claim 1.

7. The steering bearing as recited in claim 6 wherein the securing element is configured in one piece with the inner ring.

8. A steering column comprising:
  at least one steering tube;
  at least one steering bearing as recited in claim 1; and
  a steering spindle mounted rotatably in the steering tube with help of the steering bearing, the inner ring being fixed on the steering spindle at least with help of the front edges of the securing element.

* * * * *